T. H. HALEY.
COUPLING SHOE FOR TIE BANDS.
APPLICATION FILED SEPT. 26, 1913.

1,128,244.

Patented Feb. 9, 1915.

WITNESSES:
C. B. Gibbons
E. Peterson

INVENTOR:
Thomas H. Haley
BY
Pierre Barnes
ATTORNEY

UNITED STATES PATENT OFFICE.

THOMAS H. HALEY, OF SEATTLE, WASHINGTON, ASSIGNOR OF ONE-HALF TO BALLARD DROP-FORGE COMPANY, OF SEATTLE, WASHINGTON, A CORPORATION OF WASHINGTON.

COUPLING-SHOE FOR TIE-BANDS.

1,128,244. Specification of Letters Patent. Patented Feb. 9, 1915.

Application filed September 26, 1913. Serial No. 791,952.

*To all whom it may concern:*

Be it known that I, THOMAS H. HALEY, a citizen of the United States, residing at Seattle, in the county of King and State of Washington, have invented certain new and useful Improvements in Coupling-Shoes for Tie-Bands, of which the following is a specification.

This invention relates to shoes such as are employed for coupling the ends of tie-rods in banding pipes, tanks, or other structures made of staves.

The object of my improvements is the provision of an inexpensively constructed shoe which will be more convenient to apply and more efficient in use.

The invention consists in the novel construction and adaptation of devices, as will be hereinafter described and claimed.

Figure 1:
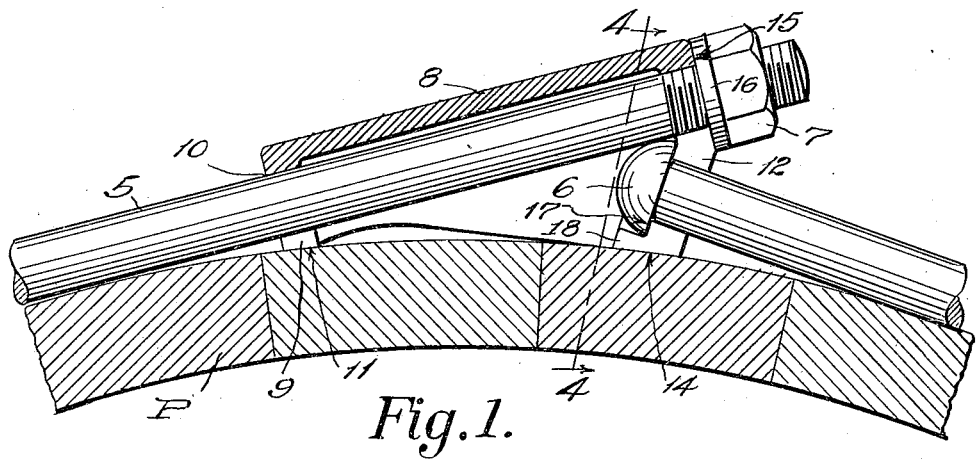
Figure 2:
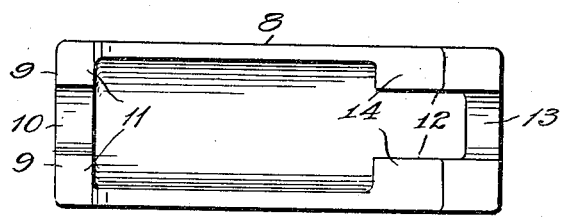
Figure 3:
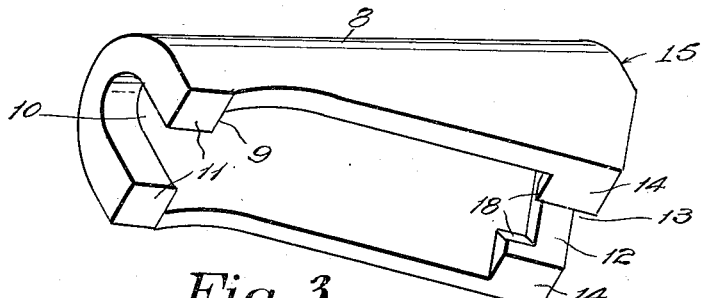
Figure 4:
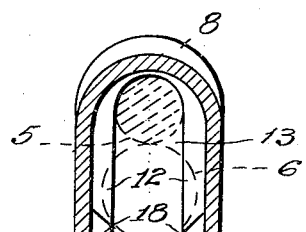

In the accompanying drawings, Figure 1 is a longitudinal vertical section of a coupling shoe embodying the present invention and shown applied. Fig. 2 is an underside plan view of the shoe. Fig. 3 is a perspective view of the same. Fig. 4 is a transverse sectional view of the shoe taken through 4—4 of Fig. 1.

The reference numeral 5 designates a band formed of a rod having a head 6 at one end and its other end screw-threaded to receive a clamping nut 7. The shoe comprises a metal shell or body 8, preferably of wrought iron or steel, of an inverted U-shape in transverse section. At one end the body is formed interiorly with a reinforcement ridge 9 extending about the aperture 10 through which the rod extends and terminating in two extremities, or toes, 11 which serve to bear upon the outer periphery of the pipe, as P in Fig. 1. The other end of the body is formed with an internal ridge 12 extending about the opening 13 constituting what may be termed a bifurcated heel, said ridge terminating in extremities 14. The heel end of the shoe is formed to provide a seat 15 at right angles to the threaded end of the band to accommodate a washer 16 which is interposed between the nut 7 and the seat. A second seat, as at 17, is provided for the band head 6 on the ridge 12 interiorly of the body and is disposed to be at right angles to the axis of the head end of the band. In proximity to the extremities of the ridge 12 the latter is provided with projections 18 whose office is to prevent the head 6 from becoming displaced from its seat 17.

To apply the invention, the band 5 is first bent about the pipe P, or other structure to which applied, the shoe being placed over the threaded end of the band so as to pass through the openings 10 and 13 at the respective ends of the body. The shoe is then hooked over the band head to have the latter caught upon the seat 17 and above the projections 18. The band and shoe being thus assembled the nut 7 is screwed down upon the thread of the band to cause the washer 16 to first engage against seat 15 and thereupon cause the threaded end of the band to be protruded through the nut and resulting in the band firmly clamping the pipe.

It is to be noted that the shoe is juxtaposed with the pipe by the members of the shoe's heel and toe thereby affording a relatively large base for supporting the shoe against tilting. The bottom of the shoe is open and the band is free to accommodate itself to the curvature of the pipe except where the band ends are extended tangentially of the pipe to engage against the opposite faces of the ridge 12 at one end of the shoe, and to which the band ends are prevented from becoming disengaged through the agency of the projections 18. The toe end of the shoe straddles the band and insures the longitudinal axis of the shoe being maintained in the plane of the band axis.

What I claim as my invention, is—

1. A coupling-shoe of substantially U-shape in transverse section with its unrestricted entrance opening in its inner face and provided at each of its ends with bearing surfaces, a ridge extending inwardly about openings at each end of the shoe, one of said ridges being formed to provide band seating surfaces upon the inside and outside, and likewise formed with inwardly directed projections in proximity to its ends, substantially as and for the purposes described.

2. A coupling-shoe comprising a body having a ridge extending inwardly from the heel end of the shoe to afford band-engaging surfaces upon the inner and outer faces of said ridge, and means provided at the toe-end of the shoe for maintaining the shoe in alinement with respect to a tie-band, said shoe being also formed with an unrestricted entrance opening in its bottom and provided at each side with surfaces adapted to bear against a pipe, substantially as and for the purposes described.

Signed at Seattle, Washington, this 26th day of August, 1913.

THOMAS H. HALEY.

Witnesses:
 PIERRE BARNES,
 HORACE BARNES.